Nov. 28, 1950 — R. A. CLARK — 2,531,933
SPRING MOUNTING FOR CHILDREN'S WAGONS OR THE LIKE
Filed Oct. 2, 1946 — 2 Sheets-Sheet 1
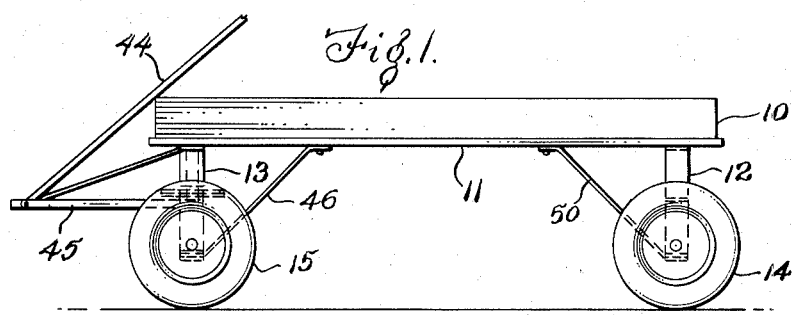
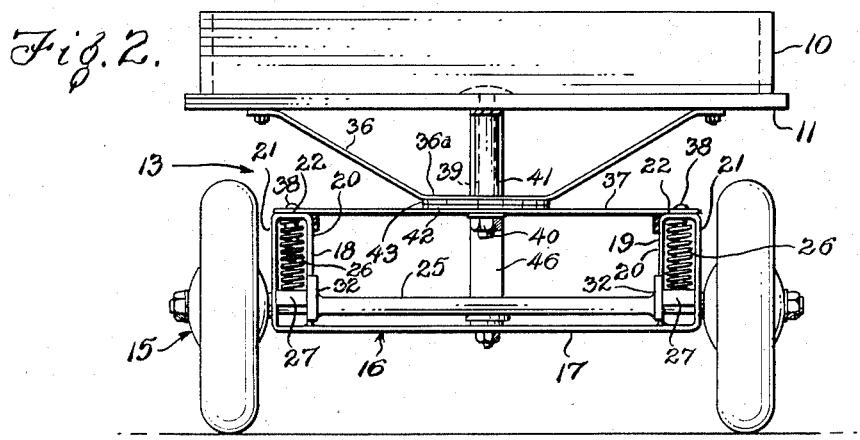
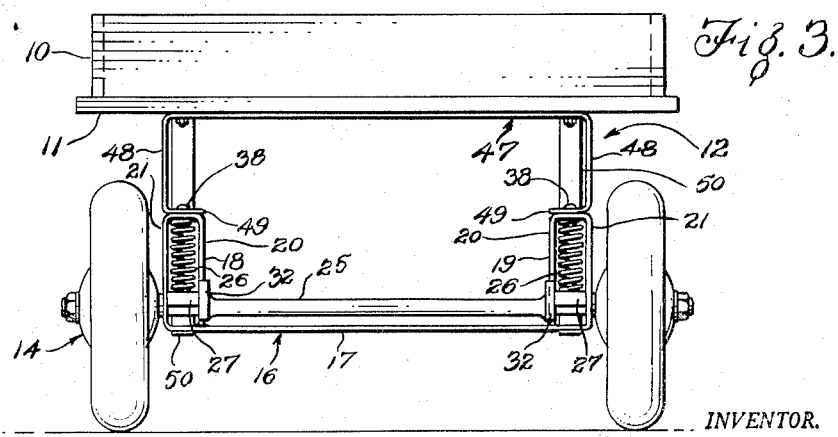
INVENTOR.
Richard A. Clark
BY William Cleland
Attorney Nov. 28, 1950 — R. A. CLARK — 2,531,933
SPRING MOUNTING FOR CHILDREN'S WAGONS OR THE LIKE
Filed Oct. 2, 1946 — 2 Sheets-Sheet 2
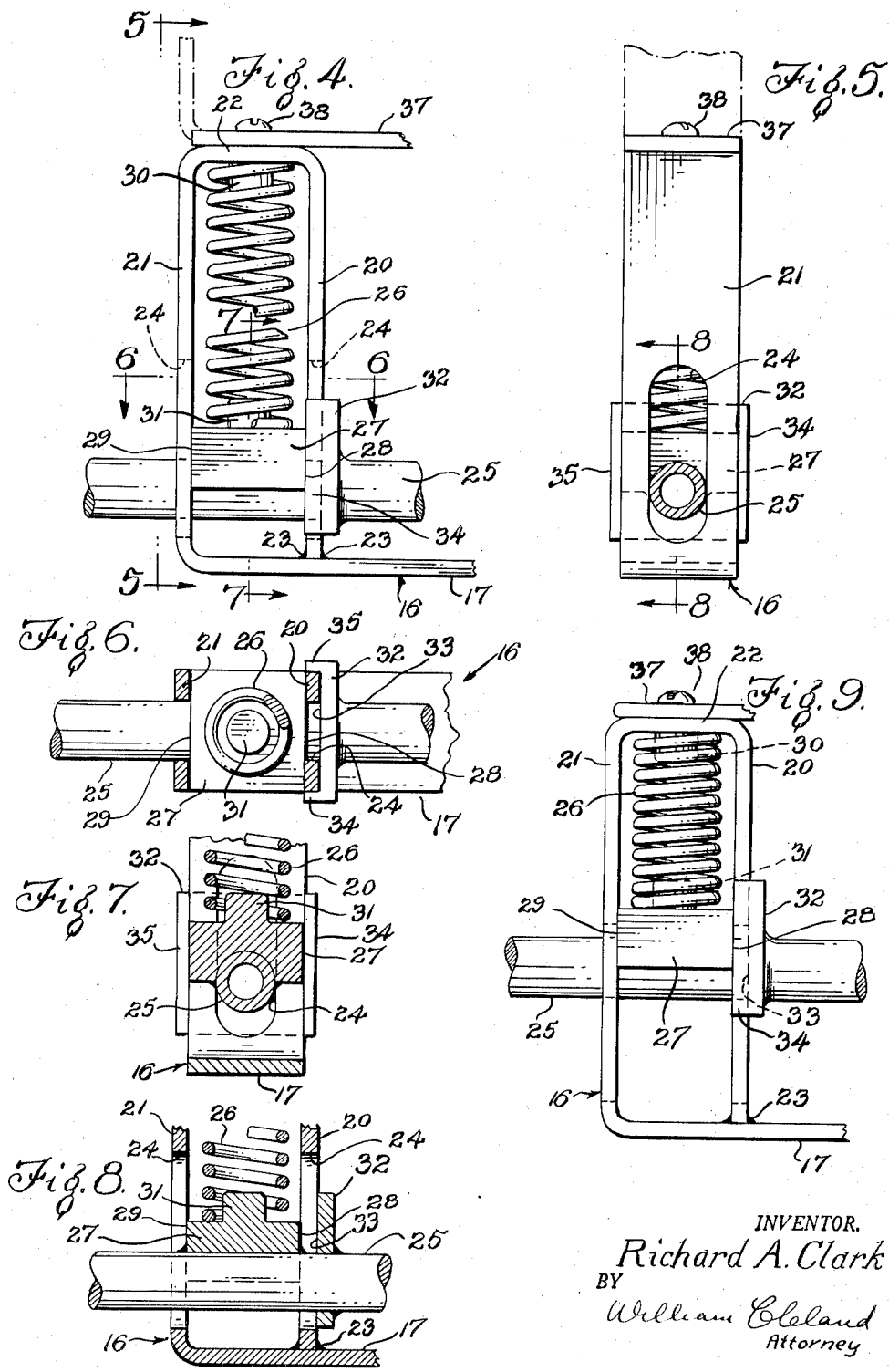
INVENTOR.
Richard A. Clark
BY William Cleland
Attorney Patented Nov. 28, 1950

2,531,933

UNITED STATES PATENT OFFICE 2,531,933

SPRING MOUNTING FOR CHILDREN'S WAGONS OR THE LIKE

Richard A. Clark, Barberton, Ohio

Application October 2, 1946, Serial No. 700,784

5 Claims. (Cl. 267—60)

This invention relates to a child's wagon or the like, and in particular relates to spring mounting means for the same.

One object of the present invention is to provide in a child's wagon or like vehicle a strong, durable wheel mounting device, including a bracket for attachment to the vehicle body, and improved means for resiliently supporting the bracket on the axle of a wheel and axle assembly in a manner which effectively prevents relative rotation of the axle, without interference with desired vertical movement of the bracket with respect to the wheel assembly.

Another object of the invention is to provide a wheel mounting device of the character described in which a maximum of the parts thereof are interchangeable for use either for a relatively rotatable front wheel mounting means of the wagon or for a relatively non-rotatable rear wheel mounting means thereof.

These and other objects of the invention will be manifest from the following brief description and the accompanying drawings.

Of the accompanying drawings:

Figure 1 is a side elevation of a child's coaster wagon embodying the features of the invention.

Figure 2 is a front end view of the wagon as viewed from the left of Figure 1.

Figure 3 is a rear end view of the wagon as viewed from the right of Figure 1.

Figure 4 is an enlarged fragmentary detailed view of a spring mounting assembly as viewed from the left of Figure 2, the parts being shown in normal condition of the wagon.

Figure 5 is a vertical cross-section taken substantially on the line 5—5 of Figure 4.

Figure 6 is a horizontal cross-section taken substantially on the line 6—6 of Figure 4.

Figure 7 is a fragmentary cross-section taken on the line 7—7 of Figure 4.

Figure 8 is a fragmentary cross-section taken on the line 8—8 of Figure 5.

Figure 9 is a view corresponding to Figure 4 but illustrating the parts in relative positions in which the spring is compressed.

Referring to the drawings, the numeral 10 designates a child's coaster wagon of well-known type having a body 10a, to the underside 11 of which may be secured front and rear spring mounting units 12 and 13, respectively, for resiliently supporting the body on wheel and axle assemblies 14 and 15.

Referring particularly to the front wheel spring mounting units 13 illustrated in Figures 2 and 4 to 9, a bracket 16 formed from a length of flat bar metal to provide a central portion 17 extending laterally of body 10a in a horizontal plane, the ends of the strip being formed upwardly, then inwardly and downwardly to provide upwardly extending rectangular loops 18 and 19. The loops 18 and 19 constitute spring housings, each having laterally spaced inner and outer walls 20 and 21, connected at the top of the bracket by an integral crosspiece 22. The ends of the bar are connected to said central portion 17 thereof, at the bottom of the bracket, by welding as indicated at 23.

The spaced sides or walls 20 and 21 of the rectangular loops have provided therein vertically elongated laterally aligned slots 24, 24, for reception of opposite end portions of an axle 25 of wheel and axle assembly 14, the axle being vertically shiftable in the slots of the housings at both sides of the bracket. For yieldingly supporting the bracket and body 10a on the wheel and axle assembly, compression springs 26, 26 are extended between the top crosspieces 22 and blocks 27, 27 integral with the axle 25, these blocks having inwardly and outwardly presented flat portions 28 and 29, for sliding engagement with the inner faces of the spaced walls 20 and 21 of the spring housings. Short projections or bosses 30 and 31 on the crosspieces 22 and blocks 27, respectively, retain the springs 26 in place within the spring housings.

Integral with the axle 25 and inwardly of the spring housings may be channel-shaped guide members 32, 32 providing outwardly presented flat faces 33, 33 for sliding engagement with the inwardly presented guide surfaces 20a of the respective walls 20, and providing spaced guide flanges 34 and 35 for sliding engagement with the correspondingly opposite vertical guide edges 20b of walls 20. Thus the axle is vertically slidable in the slots 24 against the yielding action of spring 26, and the guide flanges 34 and 35 prevent relative rotation of the axle about its axis.

The bracket 16, yieldingly supported as described, is pivoted on a flat central portion 36a (see Figure 2) at the bottom of a downwardly arched bolster 36, of bar stock, depending from the bottom 11 of body 10a at the front thereof. To this end, a strip of flat bar stock 37 comprising a cross-member is secured between the top crosspieces 22 of spring housings 18 and 19, as by means of screws 38, 38 received through apertures in the ends of the bar or cross-member 37 and threaded into said top crosspieces, and a bolt 39 extends through aligned apertures in bottom 11 of the body, in the flat portion 36a of bolster 36, and in the center of bar 37. A nut 40 is threaded on the lower end of the bolt projecting through portion 36a of the bolster against the underside of bar 37, and the bolster is reinforced against tightening of the nut by a sleeve 41 between the portion 36a and the bottom 11 of the body 10a, said bolt being received through the sleeve. Discs 42 and 43, fixed on the bar 37 and bolster portion 36a, respectively, provide bearing surface for relative rotation of the bracket with respect to the bolster. The wagon is steered by means of a handle 44, pivotally connected to a tongue 45 which is fixedly connected at laterally spaced points to the bracket. A rearwardly and upwardly inclined brace 46 is fixed at its upper end to the bottom 11 of body 10a and pivotally connected at its lower end to the bottom crosspiece 17 of the bracket on a center in alignment with the axis of the steering pivot, whereby the bracket is firmly supported in desired vertical position without interference with the steering action of the wagon.

The rear spring mounting means 12, best shown in Figure 3, includes wheel and bracket assemblies which may be in all respects similar to the front wheel and bracket assemblies 15 and 16, respectively, like parts therefore being given like numerals except as otherwise noted. In place of the cross-bar 36, and bolster 40, however, a bolster 47, secured to bottom 11 of body 10a, is formed generally rectangular, from a length of flat bar stock to have oppositely disposed, downwardly extending legs 48, 48 terminating in oppositely inwardly extending lugs 49, 49, which are apertured to receive screws 38 threaded into the top crosspieces 22 of the spring housings 18 and 19, as before. Suitable forwardly inclined, laterally spaced braces 50, 50 are secured between the bottom 11 of body 10a and the bottom cross-bar 17 of frame 16.

In the operation or use of the wagon in normal condition thereof on a level surface, the relatively movable parts will be in the positions best shown in Figures 1 to 5, 7 and 8. When overload is applied as by a wheel or wheels passing over a bump on the surface, the brackets and axles will be moved relatively of each other against the yielding action of the compression springs, as shown in Figure 8. A converse action occurs when a wheel or wheels enter a depression in said surface. Sufficient lateral play may be provided between the vertically slidable parts of the front and rear spring mounting means to permit substantially independent vertical movement of the respective wheels on passing over bumps or ruts. In all vertical positions of the front and rear axles relatively of the respective mounting brackets, the axles are non-rotatable on the axes thereof with respect to the brackets.

In the above-described spring mounting means the front and rear brackets and wheel assemblies are completely interchangeable, which is advantageous from a standpoint of production costs and other considerations.

Modifications of the invention may be resorted to without departing from the spirit of the invention or the scope of the appended claims.

What is claimed is:

1. In a vehicle of the character described, an axle, a bracket to be supported by said axle, means for attaching said bracket to the underside of a vehicle body, said bracket having spring housings at opposite sides thereof spaced laterally of the vehicle, said spring housings each having laterally spaced walls extending vertically and connected by top and bottom crosspieces, said spaced walls of each said spring housing having laterally aligned and vertically elongated slots therein for receiving said axle therethrough to be vertically shiftable therein with respect to the bracket, a compression spring in each said housing, means in each housing for mounting its compression spring between the axle and said top crosspiece, whereby said bracket and vehicle body are yieldingly supported on the axle, and slidably interengaging guide portions on said axle and said housings for preventing relative rotational movement of the axle about its axis, said bracket being formed of a length of flat strip stock to have central portion terminating at laterally spaced points in vertically extending rectangular loops, each look having spaced inner and outer sides and a top side constituting said spaced inner and outer walls and said top crosspiece, respectively.

2. In a vehicle of the character described, a wheel and axle assembly, a bracket to be supported by said assembly, means for attaching said bracket to the underside of a vehicle body, said bracket having spring housings at opposite sides thereof spaced laterally of the vehicle, said spring housings each having laterally spaced walls extending vertically and rigidly connected by top and bottom crosspieces, said spaced walls of each housing having laterally aligned and vertically elongated slots therein for receiving said axle therethrough to be vertically shiftable with respect to the bracket, said axle having portions fixed thereon providing laterally opposite side faces slidably engageable with the inner faces of said laterally spaced walls, compression springs in each of said housings between the axle and said top crosspieces, whereby said bracket and vehicle body are yieldingly supported on the axle, vertically extending guide means on said spring housings providing vertical guide edges in spaced parallel relation longitudinally of the vehicle body, and spaced guide portions fixed on said axle for vertical sliding engagement with said guide edges along a substantial length thereof and thereby adapted to prevent relative rotational movement of the axle about its axis.

3. In a vehicle of the character described, a wheel and axle assembly, a bracket to be supported by said assembly, means for attaching said bracket to the underside of a vehicle body, said bracket having spring housings fixed thereon at opposite sides thereof and spaced laterally of the vehicle, said spring housings each having laterally spaced walls extending vertically and rigidly connected by a top crosspiece, said spaced walls having laterally aligned and vertically elongated slots therein for receiving said axle therethrough to be vertically shiftable with respect to the bracket, blocks fixedly mounted on said axle and having laterally opposite side faces slidably engageable with the inner faces of said laterally spaced walls, compression springs in each of said housings between said blocks and said top crosspieces, whereby said bracket and vehicle body are yieldingly supported on the axle, vertically extending guide means on said spring housings providing vertical guide edges in spaced parallel relation longitudinally of the vehicle body, and spaced guide portions of substantial length fixed on said axle for vertical sliding engagement with said guide edges and adapted to prevent relative rotational movement of the axle about its axis.

4. In a vehicle of the character described, a wheel and axle assembly, a bracket to be supported by said assembly, means for attaching said bracket to the underside of a vehicle body, said bracket having spring housings at opposite sides thereof to be spaced laterally of the vehicle, said spring housings each having laterally spaced inner and outer walls extending vertically in parallelism and connected by a top crosspiece, said spaced walls having laterally aligned and vertically elongated slots therein for receiving said axle therethrough to be vertically shiftable therein with respect to the bracket, compression springs for each said spring housing, means for mounting said compression springs in each of said housings between the axle and said top crosspieces, whereby said bracket and vehicle body are yieldingly supported on the axle, said inner walls having oppositely inwardly presented guide surfaces and each having vertical guide edges in spaced parallel relation longitudinally of the vehicle body, and spaced guide members fixed on said axle having oppositely outwardly presented surfaces of substantial area for vertical sliding engagement with said inwardly presented guide surfaces, and each guide member having spaced guide flange portions fixed for vertical sliding engagement with said guide edges along substantial lengths thereof to prevent relative rotational movement of the axle about its axis.

5. In a vehicle of the character described, a wheel and axle assembly, a bracket to be supported by said assembly, means for attaching said bracket to the underside of a vehicle body, said bracket having spring housings at opposite sides thereof to be spaced laterally of the vehicle, said spring housings each having laterally spaced inner and outer walls extending vertically in parallelism and connected by a top crosspiece, said spaced walls having laterally aligned and vertically elongated slots therein for receiving said axle therethrough to be vertically shiftable therein with respect to the bracket, compression springs for each of said spring housings, means for mounting compression springs in said housings between the axle and said top crosspieces, whereby said bracket and vehicle body are yieldingly supported on the axle, said inner walls having oppositely inwardly presented guide surfaces and each having vertical guide edges in spaced parallel relation longitudinally of the vehicle body, spaced guide members fixed on said axle and having oppositely outwardly presented surfaces of substantial area for vertical sliding engagement with said inwardly presented guide surfaces, and each guide member having spaced guide flange portions fixed for vertical sliding engagement with said spaced vertical guide edges along substantial lengths thereof to prevent relative rotational movement of the axle about its axis, said bracket being formed of a length of flat strip stock to have central portion terminating at laterally spaced points in vertically extending rectangular loops, each loop having spaced inner and outer sides and a top side constituting said spaced inner and outer walls and said top crosspiece, respectively.

RICHARD A. CLARK.

REFERENCES CITED

The following references are of record in the file of this patent:

UNITED STATES PATENTS

| Number | Name | Date |
|---|---|---|
| 1,282,472 | Sherwood | Oct. 22, 1918 |
| 1,314,982 | Reed | Sept. 2, 1919 |
| 1,468,174 | Sherwood | Sept. 18, 1923 |
| 1,985,414 | Judd | Dec. 25, 1934 |